Jan. 26, 1960    J. J. BONDRA ET AL    2,922,632
ACCELEROMETER

Filed June 22, 1956    3 Sheets-Sheet 1

JOHN J. BONDRA,
GENE W. SMITH,
ARTHUR E. MILLER,
INVENTORS.

BY
Barkelew & Scantlebury
ATTORNEYS.

Jan. 26, 1960 J. J. BONDRA ET AL 2,922,632
ACCELEROMETER
Filed June 22, 1956 3 Sheets-Sheet 2

JOHN J. BONDRA,
GENE W. SMITH,
ARTHUR E. MILLER,
INVENTORS.

BY Bartholow + Scantlebury
ATTORNEYS.

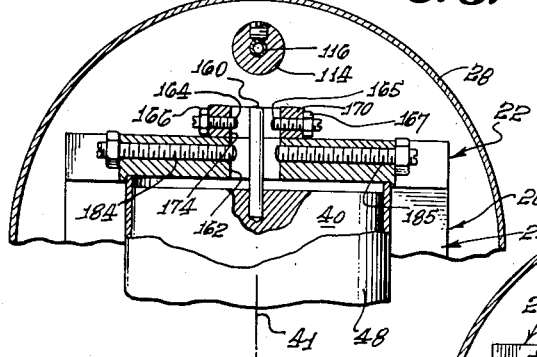
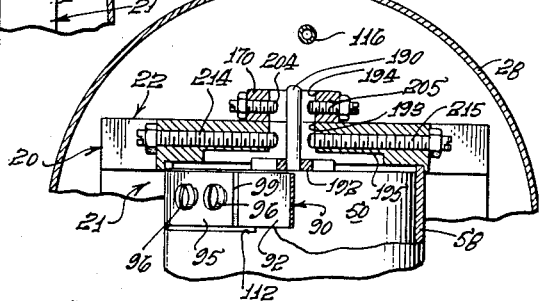
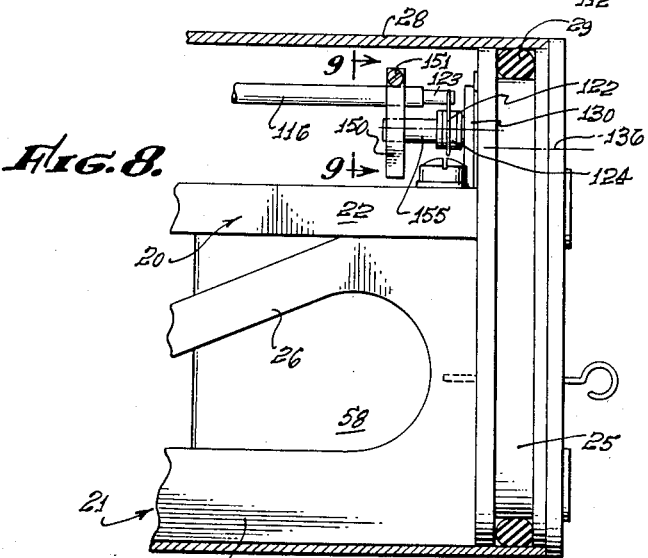
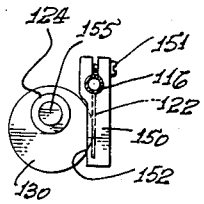
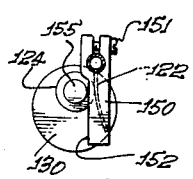

United States Patent Office 2,922,632
Patented Jan. 26, 1960

2,922,632

ACCELEROMETER

John J. Bondra, Glendora, Gene W. Smith, La Canada, and Arthur E. Miller, Pasadena, Calif., assignors to Giannini Controls Corporation, a corporation of New York Application June 22, 1956, Serial No. 593,185

7 Claims. (Cl. 264—1)

This invention is concerned generally with measuring instruments which involve one or more rotary elements responsive to a physical condition to be measured. In certain of its aspects, the invention relates more particularly to accelerometers of the type comprising two elements which are rotary in opposite directions in response to bodily linear accelerations of the instrument.

A primary advantage offered by provision of two oppositely rotating elements in accelerometers is that the instrument may be made substantially non-responsive to rotational accelerations. However, in previous instruments of that type the additional bearings that are required and the linkage system between the two rotary elements have tended to increase the friction and the possibility of inaccuracy from such causes as backlash and other types of dimensional instability of the linkage mechanism.

A primary object of the present invention is to provide an improved accelerometer of the described type. More particularly, the invention provides between the rotary elements of such an accelerometer an improved linkage which is simple and economical, substantially free of friction, and capable of operating accurately and essentially linearly.

Moreover, the preferred type of linkage in accordance with the invention imposes substantially zero loading upon the bearings of the rotary elements, tending to minimize friction in those bearings.

A further aspect of the invention has to do with means for varying the range of response of instruments of rotary type, and for correspondingly varying the range of movement within which the rotary element is permitted to operate. That aspect of the invention is useful in connection with many types of instruments, and is particularly useful in accelerometers having one or more rotary elements. In accelerometers employing two rotary elements, that aspect of the invention may provide particularly convenient and economical means for limiting the movement of the two elements to respective ranges which are directly related to the deflection at which an output signal is developed. And means may be provided for adjustably varying that deflection angle and for correspondingly varying the respective ranges of movement of the two rotary elements.

A full understanding of the invention, and of its further objects and advantages, will be had from the following description of certain illustrative embodiments, of which description the accompanying drawings form a part. The described embodiments are intended only for illustration, and the particulars of those embodiments may be modified in many respects without departing from the scope of the invention, which is defined in the appended claims.

In the drawings:

Fig. 6 is a fragmentary vertical section on the line 6—6 of Fig. 2;

Fig. 7 is a fragmentary vertical section on the line 7—7 of Fig. 2;

Fig. 8 is a fragmentary side elevation in the same aspect as Fig. 2 and illustrating a modification;

Fig. 9 is a fragmentary section on line 9—9 of Fig. 8; and

Fig. 10 is a section corresponding to Fig. 9 and showing another position of the moving parts.

Figure 4:
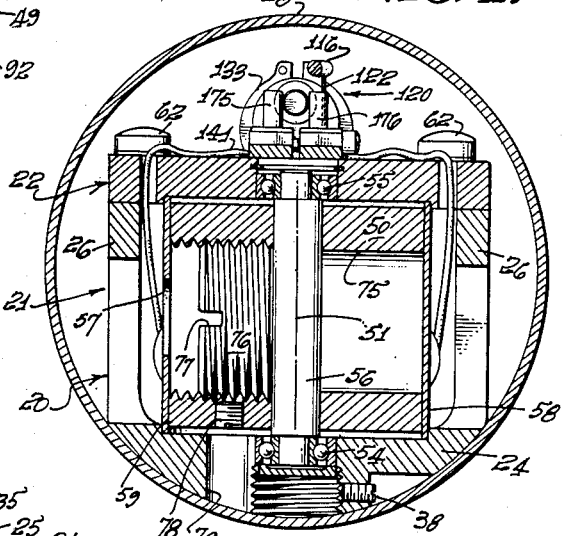
Fig. 4 is a vertical section on line 4—4 of Fig. 2.

The present illustrative embodiments of the invention comprise a rigid frame 20 on which two rotary elements 40 and 50 are journaled on respective spaced parallel axes 41 and 51. Frame 20 comprises a unitary primary frame member 21 and a top plate 22. Frame member 21 is preferably formed as a casting, and comprises a generally flat base portion 24, a circular end wall 25 extending at right angles from an edge of base 24, and diagonal brace portions 26. Top plate 22 is removably secured in spaced parallel rigid relation to base 24. A protective cover 28 is shown as a cylindrical shell, the edge of which encloses the circular periphery of frame end wall 25, with sealing means shown as the O-ring 29. Cover 28 is secured by the screws 32, which are provided with sealing washers 33 of suitable material. Frame base 24 is preferably shaped in section, as shown in Fig. 4, to fit within the cover. The frame and cover preferably form a fluid-tight housing enclosing the operating parts of the mechanism. Screw holes 34 for mounting the instrument may be provided in end wall 25.

In the typical orientation illustrated, base 24 is horizontal and end wall 25 extends vertically upward. That position will be adoped for clarity of explanation, but it is emphasized that the instrument may be utilized in many different orientations, depending upon the component of acceleration that is to be detected.

Axes 41 and 51 are vertical, as shown, and are defined by the journal bearings indicated at 44, 45 and 54, 55, which are mounted in suitable bores in base 24 and in top plate 22. Rotary elements 40 and 50 are rigidly mounted on the shafts 46 and 56, which are freely rotatable in the described bearings and support the elements in spaced relation between the base and top plate. The outer peripheral surfaces of elements 40 and 50 are accurately cylindrical. Cylindrical damping sleeves 48 and 58 are rigidly clamped between base 24 and top plate 22 in coaxial relation to the axes 41 and 51, respectively, and are closely spaced from the outer peripheries of the respective rotary elements 40 and 50. The annular spaces 49 and 59 between the elements and sleeves are preferably only a few thousandths of an inch wide, but are exaggerated in the drawings for clarity of illustration. The damping sleeves may be positioned by shallow circular wells formed in the opposing faces of base 24 and top plate 22 coaxial with axes 41 and 51 and in which the ends of the sleeves are fittingly received. Assembly of the top plate, as by the screws 61 and 62, then locks the sleeves effectively rigidly in position. Sleeve 48 may act also as a spacer between the top plate and base, but it is preferred to provide separate spacing members such as the posts indicated at 63 in Fig. 2, the lower ends of which are threaded into base 24 and the upper ends of which receive the screws 61. Those spacers and shafts 46 and 56 are preferably of material having substantially the same temperature coefficient of expansion as the material of frame 21, rendering the end play of the described bearings effectively independent of variations in temperature. The shaft bearings are preferably accurately adjustable with respect to end play. As illustrated, the bores in which bearings 44 and 54 are mounted are partially threaded to receive the adjusting screws 36. The inner ends of screws 36 are slightly conical and engage the thrust-distributing plates 37. Locking means, such as the set-screws 38 (Fig. 4), are provided to lock the screws 36 in adjusted position.

Rotary elements 40 an 50 are so arranged that their centers of mass are offset radially with respect to their respective axes, the directions of those offsets being opposite when the elements are in their normal rotational positions, as illustrated. Many different types of structure may be utilized to provide such eccentric positioning of the centers of mass. The degree of offset is preferably conveniently adjustable. As illustrated, the elements are provided with respective diametral bores 65 and 75 of relatively large diameter, in which masses 66 and 76 are received in longitudinally adjustable positions. The masses may conveniently be threadably received in the bores, and carry suitable formations, such as the screw driver slots 67 and 77, for screwing them radially in or out of their bores to adjust the degree of eccentricity with respect to the main axes of their elements. Releasable locking means are preferably provided, such as set screws set in threaded transverse bores, as at 68 and 78. It is convenient to provide access apertures for adjusting the degree of eccentricity when the instrument is assembled. As illustrated, circular apertures 47 and 57 are provided in the respective damping sleeves 48 and 58 in position to expose the screwdriver slots in the respective masses when the rotary elements are in normal position; and vertical bores are provided in frame base 24 in alignment with the normal positions of the respective set screws, as illustrated at 79 in Fig. 4.

In preferred form of the invention and as illustratively shown, the two rotary elements 40 and 50 are linked together, and their normal positions with respect to each other and to the frame are yieldingly established, by means of an extremely simple and effective mechanism indicated generally at 90. Mechanism 90 typically comprises a single elongated member 92, preferably of spring sheet material, having its end portions 93 rigidly secured to the respective rotary elements. The end portions of link member 92 are preferably fixed to the rotary elements in substantially tangential relation at radii from their respective axes that are inversely proportional to the products of their respective masses by the radii of their centers of gravity. The two inertial elements are preferably effectively identical dynamically, so that their masses and the radii of their centers of gravity are equal. The radii of connection of link 92, are then preferably equal, as in the present embodiment.

Figure 3:
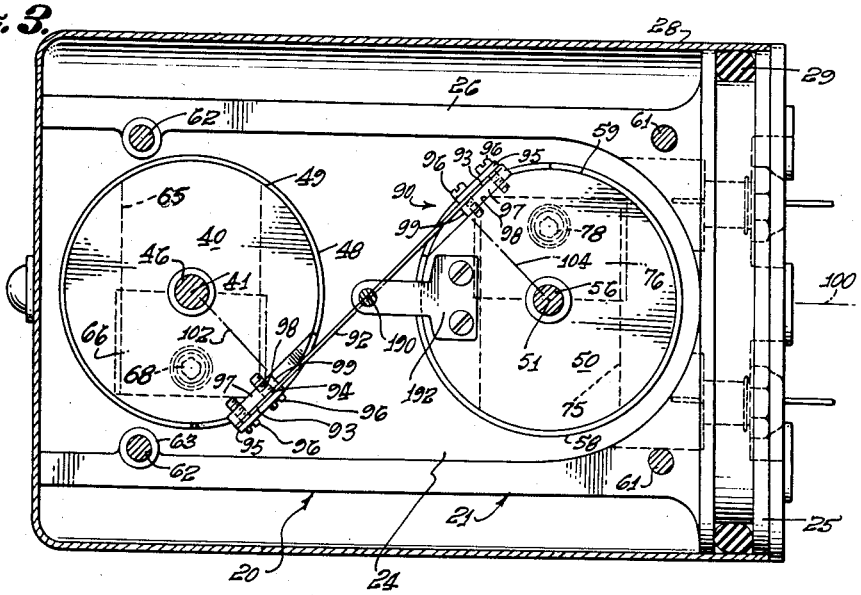
Fig. 3 is a horizontal section generally on line 3—3 of Fig. 2.
Figure 3A:
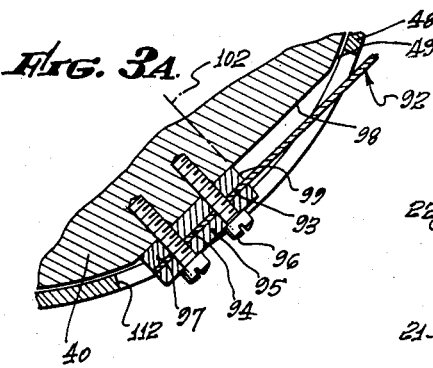
Fig. 3A is a fragmentary horizontal section on line 3A—3A of Fig. 2 at enlarged scale.

Between the end portions of link 92 which are fixed to the respective rotary elements, the body of the link extends unsupported, as shown best in Fig. 3. In normal position of the mechanism link 92 is preferably rectilinear and lies substantially in a plane that intersects the plane 100 of axes 41 and 51 at an oblique angle.

Each end portion 93 of link 92 may, for example, be clamped between a flat surface 94 of the rotary element and a keeper plate 95 which is secured by the screws 96. Surface 94 may be formed directly by the body of the rotary element, which is then preferably relieved to define a definite boundary edge which divides the fixed and the free portions of the spring. In the present embodiment, such relief is effectively provided by insertion of the mounting block 97 between the link and a flat face 98 of the rotary element. The link-supporting face 95 is then defined longitudinally of the spring by the dimensions and position of block 97. The free intermediate portion of link 92 is defined by the edge 99 of block 97, and by the corresponding edge of keeper plate 95, which edges are preferably directly opposite each other with respect to the plane of the link. Link-supporting face 94 may, in any case, be considered a part of the rotary element. That face of one rotary element engages one face of the link at one end, and the supporting face of the other element engages the opposite face of the link at its other end. The points of connection of the link to the respective rotary elements lie on opposite sides of the plane of the axes, indicated at 100 in Fig. 3.

In accordance with the invention it is preferred that, in normal position of the device, link 92 cross axial plane 100 at an oblique angle which approximates 45°. Further, it is preferred that the defining edges 99 be so located that the planes through them and the respective axes 41 and 51, which planes are indicated at 102 and 104, form equal angles with the link-supporting faces 94. Those angles are preferably approximately equal to a right angle.

With the described preferred arrangement, the unsupported portion of link 92 is rectilinear in normal position of the device, and has a length approximately equal to the sum of the radial distances of the two supporting faces 94 from their respective axes; and the separation of the two axes 41 and 51 is approximately equal to that sum multiplied by the square root of two. Hence, the actual radii of the rotary elements may be made considerably greater, if desired, than the effective radii at which the link acts without causing mutual interference of the two rotary inertial elements.

With the described linkage mechanism acting between the two rotary elements, they are effectively prevented from rotating simultaneously in the same sense about their respective axes, since that would require a change in the effective length of link 92. For practical purposes, the link may be considered non-extensible, but if subjected to sufficient compression force, it may snap into an S-curve, effectively reducing its length and permitting counterclockwise rotation of both members. For clarity of description, the directions of rotation of the inertial elements will be described as clockwise or counterclockwise as the elements are seen in Fig. 3, for example. Such buckling of link 92 occurs only if abnormally high torques are applied, as in response to an impact force of some type, and may be neglected in considering normal operation of the device.

On the other hand, rotation of the rotary elements in opposite senses through angles which have a definite mutual relation, typified by substantial equality, does not require a change of effective length of link 92. For most practical purposes in the present embodiment, the magnitudes of such permitted rotations may be considered equal for the two elements, the departure from that relation being of the second order and being usually negligible for moderate angular deflections such as 5 to 10°. Since such permitted rotation of the elements produces rotation of the opposite end portions of link 92 in opposite directions, such rotation of the elements necessarily involves bending of the link. The degree of that bending is directly equal to the sum of the angles through which the respective elements turn from their equilibrium positions, and the link deflection is substantially uniformly distributed longitudinally of the link. Hence the yielding restoring force exerted by the resilient link upon the members, tending to return them to equilibrium position, is substantially directly proportional to their angular deflection from that position. The constant of proportionality depends upon the modulus of elasticity of the link material, and varies inversely with the length of the free portion of link 92 and directly with its transverse dimensions. Hence, in design of the mechanism, the effective spring rate may be given any desired value within a very wide range.

A particular advantage of the present type of linkage is that it produces substantially zero friction and yet is free of play or backlash. Moreover, in equilibrium position of the device the spring force exerted upon the bearings of the rotary elements is zero. That has the great advantage of permitting reduction of the bearing friction to a minimum at the most critical time, namely, when the device is first deflected from its rest position. Reduction of the starting or breakaway friction enables the device to respond reliably to relatively small initial accelerations, thereby improving its effective sensitivity and accuracy.

It is desirable to damp the movement of the rotary elements, to prevent undue oscillatory movement at the natural frequency corresponding to their effective moments of inertia and the resilient action of link 92. Such action may be provided by damping means of any suitable type. It has been found particularly effective and convenient to provide damping sleeves 48 and 58, already described, whose inner faces are in closely spaced relation to the outer peripheral faces of the rotary elements; and to place a suitable viscous material in the annular spaces 49 and 59 between those faces. That may be accomplished, for example, by filling the entire housing with a suitable damping medium, such as an oil of moderate viscosity. A filling plug 110 is provided for that purpose in frame end wall 25.

The output indication or signal from an instrument of the present type may be taken conveniently from either one of the shafts 46 and 56, or signals may be taken from both shafts. In the present illustrative embodiment, the output is taken from shaft 46 and is of the illustrative type which involves closure of electrical switch contacts in response to a predetermined critical value of acceleration. The magnitude of that critical value is preferably adjustably variable, and an important aspect of the invention relates to improved means for providing such adjustment. Such output switch mechanism is indicated generally by the numeral 120.

Shaft 46 extends upward through bearing 45, and carries a transverse arm 116, which is fixed to the shaft end 115 by means of a hub 117 and set screw 118. Arm 116 is preferably insulated from the shaft, as by the mounting disks 119 of suitable dielectric material, between which the arm is clamped by the screws 119a. An electrical connection to the arm, indicated at 121, may comprise a flexible insulated wire. Arm 116 preferably comprises a very light member such as a hollow tube and is accurately counterbalanced, as by the mass 114.

The outer end of arm 116 carries an electrical brush contact, adapted to engage a fixed contact 124 mounted on the inner side of frame end wall 25. As shown, a brush support 123 of resilient sheet material extends outward in a vertical plane from the end of arm 116, with a vertical contact rod or wire 122 extending downward from its end.

Fixed contact 124 is adjustably mounted by means of a support hub 130, which is rotatably mounted in a through bore 130a in end wall 25. Hub 130 is preferably provided with sealing means, such as the O-ring 131, and with driving means, such as the screwdriver slot 132, by which its rotary position may be adjusted. A spring retaining washer 133 presses hub 130 axially into frictional engagement with an inner flange of bore 130a, effectively locking the hub in any rotary position to which it may be adjusted. A scale and a reference index are preferably provided on the outside of frame wall 25 to indicate the existing setting. For example, a scale 134 on the wall and a reference index 135 on the hub are indicated in Fig. 5.

Contact 124 is mounted on hub 130 eccentrically with respect to its axis 136, so that hub rotation causes transverse movement of the contact. The contact working surface is preferably cylindrical, and may comprise the peripheral surface of a ring which is carried in insulated relationship by the pin 140. An electrical connection of flexible wire 141 may be soldered to the ring at a position where it will not interfere with engagement by brush 122. Rotary adjustment of hub 130 thus shifts fixed contact 124 transversely of brush arm 116, and thereby alters the angular position of that arm at which the contact is engaged by brush 122. The vertical position of fixed contact 124 is also modified by such adjustment, but that does not affect operation, since the working face of brush 122 is vertical and is long enough to accommodate all positions of contact 124. Moreover, the circular form of contact 124 insures that operation is not affected by rotation of that contact except insofar as transverse movement results from such rotation by virtue of the described eccentric mounting of contact 124 with respect to the hub axis.

Figure 1:
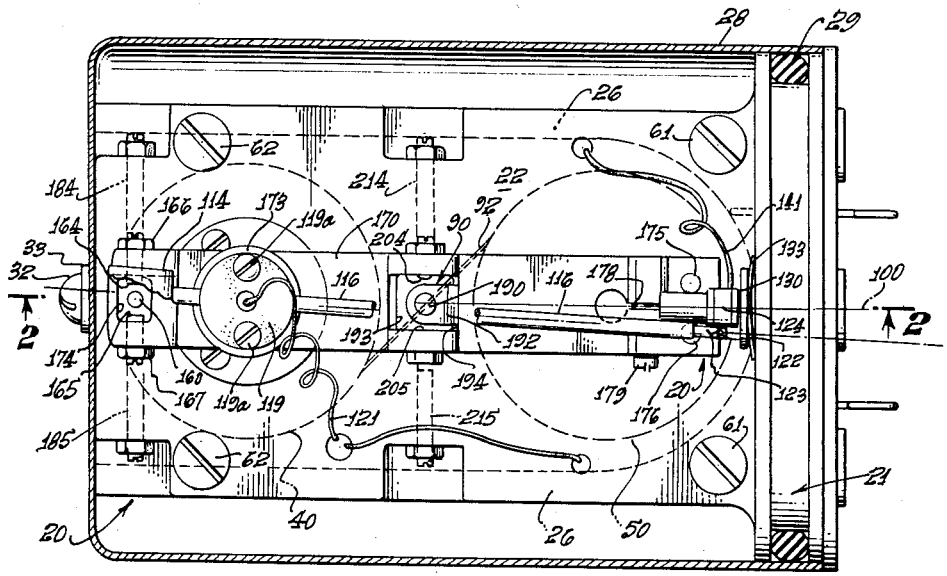
Fig. 1 is a plan of an illustrative embodiment of the invention, with the cover partially cut away.
Figure 2:
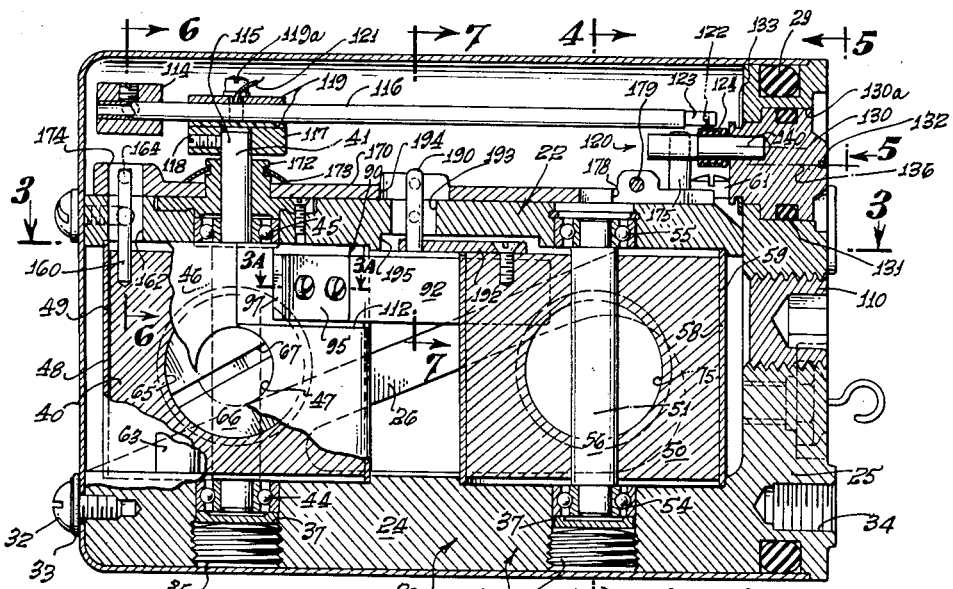
Fig. 2 is a vertical section on line 2—2 of Fig. 1.

Brush 122 may be mounted on shaft 46 in such angular relation that, with a given setting of hub 130, switch contact occurs in response to any desired degree of acceleration. For example, if the device is accelerated rectilinearly to the left in Figs. 1, 2 and 3, shaft 46 tends to rotate counterclockwise as seen in Figs. 1 and 2, swinging brush 122 from the equilibrium position shown in Fig. 1 toward fixed contact 124. Such contact typically occurs in the present embodiment, with hub 130 in the intermediate position illustrated, when the magnitude of the acceleration reaches 0.3 g, where g represents the acceleration of gravity. That actuating value of the acceleration is preferably readable directly from scale 134 as indicated in Fig. 5.

Figure 5:
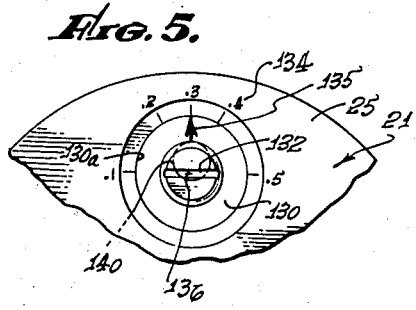
Fig. 5 is a fragmentary end elevation in the aspect indicated by line 5—5 of Fig. 2.

Rotation of hub 130 counterclockwise from the position of Fig. 5 till index 135 reaches scale mark 0.1 shifts eccentric pin 140 to the left, bringing fixed contact 124 closer to the equilibrium position of brush 122 by an amount equal to the radial offset of pin 140. Similarly, clockwise rotation of hub 130 to scale position 0.5 moves contact 124 away from brush 122 by the same distance. In the present embodiment, that distance equals the brush movement for an acceleration of 0.2 g; hence the acceleration required to close the switch in the two extreme hub positions just described are 0.1 g and 0.5 g, respectively, as indicated by the scale notations. The intermediate scale divisions, such as those marked 0.2 and 0.4, correspond linearly to the transverse position of pin 140, but appear in non-linear relation on the scale itself, due to the cosine relation of the eccentric action.

A further aspect of the invention provides stop mechanism adapted to restrict rotary elements 40 and 50 to a definite range of movement. Such stop means are highly desirable to prevent injury to delicate parts, such as brush 122, which might result from abnormally high accelerations or accidental shocks. For the specific purpose of protecting the brush it is desirable to stop counterclockwise rotation of element 40 at an angular position at which the brush engages contact 124 and is deflected by that engagement enough to provide reliable electrical contact but not enough to approach the elastic limit of resilient brush support 123. That preferred stop position is sufficiently critical that a fixed stop position is not satisfactory for all available adjustments of the switch. Instead, it is highly desirable, if not essential, that the stop position be variable in direct correspondence to variation of the adjusted position of switch contact 124.

A particularly simple and economical manner of providing such protective stop means is illustrated in Figs. 8 to 10. Those figures correspond to the embodiment of Figs. 1 to 7 with respect to the features already described, but show a modified form of stop means. In Figs. 8 to 10, a stop formation 150 is rigidly mounted on arm 116, as by the clamp screw 151, and provides a vertical working face 152 which is closely spaced longitudinally of the arm from brush 122. Eccentric pin 140 is provided with a cylindrical coaxial extension 155, which serves as an abutment for stop formation 150. The level of stop face 152 is such that it engages abutment 155 only after brush 122 has engaged contact 124 and becomes slightly deflected, as shown in Fig. 10.

Since the brush in normal position is parallel to stop face 152, and since contact 124 and abutment 155 are coaxial, that relation of the stop action is effective independently of the rotational adjustment of hub 130. Hence, as the angular position of switch action is adjusted, the position of stop action is automatically shifted correspondingly.

Whereas stop mechanism acting directly on brush arm 116, as in the illustrative modification just described, protects the brush and is satisfactory under many conditions, it is preferred to provide, as an alternative or as a supplement to such stop action, mechanism which directly stops the movement of one or both of the relatively massive rotary members 40 and 50. Such mechanism reduces the maximum torque that brush arm 116 and its mounting on shaft 46 is required to withstand, permitting those parts to be lighter without sacrifice of accuracy and reliability.

In the present preferred modification, inertial element 40 carries a rigidly mounted stop formation in the form of a stop pin 160, which is set in the upper axial face of the element near its periphery. Stop pin 160 extends upward through a clearance aperture 162 in frame top plate 22, that aperture being large enough to accommodate the maximum movement required of element 40 under all operating conditions.

Various types of abutment may be provided for engagement by stop pin 160, according to the type of action desired. As illustrated, abutments 164 and 165 are mounted in position to limit rotation of element 40 in clockwise and counterclockwise directions, respectively, that limitation being automatically variable in direct correspondence to the condition of adjustment of output switch 120. A stop carrier 170 is mounted for pivotal movement about axis 41. As shown, carrier 170 comprises an elongated plate which slidingly engages the upper face of frame top plate 22. Movement of carrier 170 is guided by the sleeve 172, which is fixedly mounted on top plate 22 concentrically of axis 41 and is received by a fitting hole in the carrier. A resilient retaining washer 173 presses the carrier into sliding contact with the surface of top plate 22. Carrier 170 is provided with a clearance aperture 174, which freely receives the upper end of stop pin 160. Threaded transverse bores in carrier 170 receive screws the ends of which extend into aperture 174 on opposite sides of stop pin 160, forming the abutments 164 and 165. Lock-nuts 166 and 167 are provided for locking the respective abutments in adjusted position with respect to the carrier.

Carrier 170 is driven in its pivotal movement about axis 41 from switch-adjusting hub 130, as by means of any suitable linkage mechanism. As shown, the free end of eccentric pin 140 is fittingly received between the two upwardly extending driving pins 175 and 176, which are fixedly mounted in carrier 170. Upon rotational adjustment of hub 130, the resulting vertical component of the movement of pin 140 causes it to slide freely between driving pins 175 and 176; but the horizontal component of the eccentric pin movement causes carrier 170 to swing about its pivot sleeve 172. The end portion of carrier 170 is preferably longitudinally slotted, as at 178, driving pins 175 and 176 being mounted on opposite sides of the slot. The screw 179 provides convenient adjustment of the pin spacing to insure smooth operation without play.

The radius at which driving pins 175 and 176 are mounted on carrier 170 with respect to axis 41 is substantially equal to the radius with respect to the same axis at which brush 122 is mounted on brush arm 116. Therefore, adjustment of hub 130 produces substantially equal changes in the angle at which switch closure occurs and in the angular positions of abutments 164 and 165.

Abutment 165 is preferably so adjusted with respect to carrier 170 that counterclockwise rotation of element 40 is stopped just after switch closure, with brush 122 deflected sufficiently to insure reliable electrical contact but not enough to risk damage to the brush. That relation may be established for any position of hub 130, for example for the intermediate position illustrated, and is then effective without substantial variation for all other hub settings.

Abutment 164 may be set in various positions, according to the action desired. For example, with hub 130 set for closure of output switch 120 at the highest available value of acceleration, 0.5 $g$ in the present embodiment, abutment 164 may be set to prevent clockwise rotation of element 40 beyond its equilibrium, or zero acceleration, position. The result of that setting is to permit a uniform angular range of rotation for all settings of hub 130, that range being sufficient to permit, for all hub settings, free movement of the device between zero and switch-actuating positions. Alternatively, abutment 164 may be shifted inward, restricting the device to a smaller range of movement than that just described. The stop mechanism may then hold the device away from zero position by an amount which increases with the value of acceleration at which switch 120 is set to operate. Such relatively severe restriction of the movement of the device tends to eliminate oscillations and reduce the possibility of damage from violent shocks, but does not interfere with accurate switch actuation under normal service.

It is sometimes desirable to provide fixed limit stops which are individually adjustable but which act independently of the switch setting. Such stops are indicated at 184 and 185, and comprise screws which are adjustable in threaded horizontal bores in frame top plate 22, the inner ends of the screws extending into clearance aperture 162 on opposite sides of stop pin 160. Independent stops 184 and 185 may be employed, for example, to set absolute limits beyond which the mechanism cannot rotate regardless of the condition of adjustment of switch 120.

It is preferred to provide stop mechanism for auxiliary rotary element 50 as well as for primary element 40, so that the linkage mechanism between the two elements is relieved of some or all of the stresses it would otherwise have to support. For many purposes, particularly with the present type of linkage mechanism between the elements, it is not necessary that the stop means for the auxiliary element be variable with switch adjustment. Link 92 is inherently very strong against longitudinal tension. Hence clockwise rotation of element 50 can safely be limited, if desired, via link 92 by the same stop mechanism that limits counterclockwise rotation of primary element 40. The latter stop mechanism has already been described in illustrative form. Moreover, link 92 is ordinarily capable of being compressed longitudinally without injury, so long as such compression is not excessive. Hence, when clockwise rotation of primary element 40 is stopped abruptly at a particular angle, it is usually sufficient to stop the corresponding counterclockwise rotation of auxiliary element 50 within a few degrees of the corresponding angle. A single setting of the counterclockwise stop for element 50 may therefore accommodate all settings of hub 130, for example.

However, the present invention provides stop means for both rotary elements which are automatically variable in accordance with the output switch setting. That may be accomplished by mounting a stop formation on element 50 in position to engage an abutment on carrier 170, the working faces of the stop formation and of the abutment being located at substantially equal radii with respect to axes 51 and 41, respectively.

As illustratively shown, the stop pin 190 is fixedly mounted with respect to rotary element 50 by means of the bracket 192. In normal operating position of the instrument, stop pin 190 lies approximately midway between axes 41 and 51 and approximately in the plane of those axes. The pin projects upward through a clearance aperture 193 in frame top plate 22 and into a clearance aperture 194 in carrier 170. A clearance channel 195 may be formed in the under face of top plate 22 to accommodate bracket 192. Abutments 204 and 205 for limiting the clockwise and counterclockwise rotation, respectively, of element 50 are shown as screws received in threaded holes in carrier 170 and extending into aperture 194 on opposite sides of stop pin 190. Corresponding abutments which act independently of the position of carrier 170 are shown illustratively as the screws 214 and 215, respectively, which are received in horizontal threaded bores in top plate 22 and extend into aperture 193 on opposite sides of stop pin 190. Stop screws 204, 205, 214 and 215, are preferably provided with locking means such as the lock nuts indicated in the drawings.

Abutments 204 and 205 are typically so adjusted in carrier 170 that they stop inertial element 50 at angular positions which substantially correspond to the angular positions at which element 40 is stopped by abutments 165 and 164, respectively. That adjustment may be made for any setting of hub 130, for example the intermediate setting illustrated, and will then apply without significant modification at other settings, since movement of carrier 170 causes abutments 214 and 215 to swing about axis 51 through an angle which is substantially equal in magnitude and opposite in sense to the angle through which abutments 204 and 205 swing about axis 41.

Fixed abutment 215 may be set to stop counterclockwise rotation of element 50 substantially at its equilibrium or zero position; and abutment 214 may be set to stop clockwise rotation of element 50 just beyond the maximum deflection required by any setting of hub 130, which corresponds to 0.5 $g$ in the present embodiment.

In actual practice it may be preferred to omit certain portions of the stop mechanism that has been described, depending upon the service for which the instrument is intended. However, it is usually desirable to provide positive limits of some type at both ends of the working ranges of both rotary elements. For example, rearward rotation of both elements (clockwise for 40 and counterclockwise for 50) may be limited by fixed abutments such as 184 and 215; and forward rotation of both elements (counterclockwise for 40 and clockwise for 50) may be limited by abutments such as 165 and 204, which are movable in accordance with the condition of output switch 120. Movable stop means for brush arm 116, such as that illustrated in Figs. 8 to 10, may be provided, if desired, to supplement or to replace part or all of the stop means of Figs. 1 to 7.

We claim:
1. In an accelerometer comprising two inertial elements journaled on respective spaced parallel axes for rotation through respective ranges of angular movement, the centers of mass of the elements being offset from their respective axes in substantially opposite directions, and output means responsive to rotation of at least one of the inertial elements; a single elongated normally flat coupling member of resilient sheet material, and means rigidly connecting opposite end portions of the coupling member to the respective inertial elements on opposite sides of the plane of the axes, with the coupling member lying normally in a plane parallel to the axes and defining respective normal rotational positions of the inertial members, said coupling member having a substantially invariable length and thereby positively opposing rotation of the members from said positions in a common direction, and said coupling member being transversely flexible and tending to return to its normally flat form with a predetermined spring force, whereby rotation of the members in opposite directions from said positions is yieldingly permitted in opposition to said spring force, said single coupling member forming essentially the sole mechanical restraint upon rotational movement of the inertial members within their said ranges of movement, and exerting substantially zero force upon said members in normal position thereof.

2. Accelerometer structure as defined in claim 1 and in which the coupling member in normal position intersects the plane of the axes at an angle of approximately 45 degrees.

3. In an accelerometer which comprises a frame, first and second inertial elements journaled with respect to the frame on respective first and second spaced parallel axes, the centers of mass of the respective elements being offset from their axes in substantially opposite directions, and means positively opposing rotation of the elements in the same direction and yieldingly permitting their rotation through equal angles in opposite directions; stop means for the members comprising a support mounted on the frame for pivotal movement about the first axis, a first pair of stop formations mounted on the support and on the first element, respectively, and having mutually engageable faces, a second pair of stop formations mounted on the support and on the second element respectively, and having mutually engageable faces, the radial distances of the last said faces from the first and second axes, respectively, being substantially equal to each other and to half of the distance between those axes, and means for adjustably varying the angular position of the support.

4. In an accelerometer which comprises a frame, first and second inertial elements journaled with respect to the frame on spaced parallel axes, the centers of mass of the respective elements being offset from their axes in substantially opposite directions, and means positively opposing rotation of the elements in the same direction and yieldingly permitting their rotation through equal angles in opposite directions; cooperating electrical formations mounted on one of the elements and on the frame, respectively, and adapted to produce a signal by virtue of relative rotation thereof, first and second stop means acting between the respective inertial elements and the frame and adapted to limit the respective rotary movements thereof at definite limit positions, adjusting means for varying the angular position of the frame-mounted electrical formation with respect to the axis of said one element, and means for simultaneously shifting the limit positions of the respective stop means in opposite directions with respect to the respective axes under control of said adjusting means.

5. In an accelerometer which comprises a frame, and an inertial element journaled with respect to the frame on a rotation axis and rotatable with respect to the frame in response to bodily acceleration thereof; indicating means comprising a support adjustably mounted on the frame for rotation about a support axis transverse of the rotation axis, structure forming a substantially cylindrical electrically conductive surface mounted on the support in electrically insulated relation therefrom with the cylindrical axis of the surface parallel to, and offset from, the support axis, electrical means mounted on the inertial element eccentrically of the rotation axis in position to engage the surface and thereby to develop a signal by virtue of rotation of the inertial element through an angular position which is variable in accordance with the rotational position of the support.

6. Indicating means as defined in claim 5 and including also structure forming a second substantially cylindrical surface mounted on the support coaxially with the first mentioned surface, and an abutment mounted on the inertial element in position to engage said second surface and thereby to limit rotation of the inertial element at an angular position which is variable in accordance with the rotational position of the support.

7. Indicating means as defined in claim 5 and including also structure forming a second substantially cylindrical surface mounted on the support coaxially with the first mentioned surface, a stop carrier mounted for rotation about the rotation axis, yoke means on the carrier engaging the second surface and thereby defining the rotational position of the stop carrier, and cooperating stop formations mounted on the inertial element and on the stop carrier, respectively, and adapted to limit relative rotation thereof.

References Cited in the file of this patent

UNITED STATES PATENTS

| | | |
|---|---|---|
| 1,624,476 | Cummings | Apr. 12, 1927 |
| 2,366,346 | Malone | Jan. 2, 1945 |
| 2,640,900 | Klose | June 2, 1953 |
| 2,706,401 | Spaulding | Apr. 19, 1955 |

FOREIGN PATENTS

| | | |
|---|---|---|
| 200,132 | Great Britain | July 2, 1923 |